United States Patent [19]

Anderson

[11] Patent Number: 4,497,833
[45] Date of Patent: Feb. 5, 1985

[54] MYCOSTATIC WHEY AND PROCESS OF MANUFACTURE

[75] Inventor: Thomas M. Anderson, Emeryville, Calif.

[73] Assignee: Stauffer Chemical Company, Westport, Conn.

[21] Appl. No.: 379,841

[22] Filed: May 20, 1982

[51] Int. Cl.³ .......................... A23C 21/02; C12P 7/52
[52] U.S. Cl. ..................................... 426/41; 426/335; 426/532; 426/583; 435/141
[58] Field of Search ..................... 426/34, 41, 43, 532, 426/583, 330.2, 334, 335; 435/141

[56] References Cited

U.S. PATENT DOCUMENTS 1,937,672  12/1933  Sherman ............................. 435/141
2,465,905  3/1949  Meade et al. ......................... 426/41

FOREIGN PATENT DOCUMENTS 0618210  4/1961  Canada ............................... 435/141

OTHER PUBLICATIONS

Jay; Modern Food Micro, D. Van Nostrand, 2 Ed., 1978, pp. 167–168.

Primary Examiner—Robert Yoncoskie
Assistant Examiner—Marianne S. Minnick
Attorney, Agent, or Firm—Paul R. Martin

[57] ABSTRACT

An improved fermented whey having mycostatic activity in which the whey is produced from the fermentation of whey using as a fermenting agent the bacterium *Propionibacterium acidi-propionici* #B 3568.

4 Claims, No Drawings

MYCOSTATIC WHEY AND PROCESS OF MANUFACTURE

BACKGROUND OF THE INVENTION

The present invention is related to an improved fermented whey for use as a mycostat, and the process of manufacture of it.

Whey, a naturally occurring substance, is the serum or watery part of milk that is separated from the curds in the process of the manufacture of cheese. Dried whey contains about 73% lactose and 13% protein, with the balance being inorganic salts.

In the present state of the art, whey is used for many different purposes, including incorporation of it into non-fat dried milk, as a source of B-vitamins, as protein food supplements, as a supplement for cereal grains and, when in fermented form, as a mycostat or preservative in bread and other bakery products. Whey is fermented by a number of microorganisms, and a current process for making what may be termed "functionalized whey" involves the use of the bacterium *Propionibacterium shermanii*. Fermented whey, formed by the propionic fermentation, has been found to be an effective natural preservative or mycostat when incorporated into breads and other cereal products of a similar nature. See, for example, *Baker's Digest*, 49(3), pp. 38–39 (1975), and Agric. Acad., Inst. Food Technol., Warsaw, Pol., *Zesz. Nauk. Szh. Gl. Gospod. Wiejsk. Ikad, Roln, Warszaqie, Technol. Riono-Spozyw.*, 12, pp. 23–26, 1977 (pubs. 1978). It can replace chemical preservatives and is of substantial commercial importance in the sale of "natural" bakery products. The degree of mycostatic effectiveness of whey has been found to depend upon the amount of propionic acid produced in situ by the bacterium in the fermentation process. Thus, the greater the amount of propionic acid produced in the fermentation of whey, the greater the mycostatic activity when the whey is incorporated into breads, cakes, and the like.

SUMMARY OF THE INVENTION

It has now been discovered that an improved fermented whey having greater mycostatic activity than previously available, can be produced by substituting the bacterium *Propionibacterium acidi-propionici* #B 3568 for the bacterium which was previously used, this being bacterium *Propionibacterium shermanii*.

The product produced by this substitution contains a substantially greater quantity of propionic acid, which is the mycostatic agent in fermented whey, than previously produced whey. Thus, the whey produced in accordance with the method of this invention has substantially greater mycostatic activity than the whey produced in accordance with the methods of the prior art.

Accordingly, therefore, the process of this invention comprises fermenting whey utilizing as a fermenting agent *Propionibacterium acidi-propionici* #B 3568, said fermenting agent being designated NRRL #B-3568, obtained from the United States Department of Agriculture, Northern Regional Research Center, 1815 North University Street, Peoria, Ill. 61604.

The process of the invention, and the fermented mycostatic whey produced in accordance with the process, will be more fully understood by reference to the following examples in which the process is described.

EXAMPLE 1

Fermentation of Whey with *Propionibacterium acidi-propionici*

A fermentation medium consisting of 25,000 gallons of 7% sweet whey solids obtained from a local dairy, and 0.5% yeast extract (KAT), was sterilized and inoculated with 2500 gallons of a solution of *Propionibacterium acici-propionici* #B 3568 obtained from U.S.D.A. Northern Regional Research Labs. The bacterium had been initially grown in a broth of about 250 ml., and had been serially diluted in 10 fold increments, with the inoculum being regrown each time, until the desired volume was obtained. The fermentation mixture was then incubated for 66 hours at 35° C. The pH was maintained at 7.0 and adjusted periodically by the addition of sodium hydroxide. At the end of the incubation period, the then fermented whey was spray-dried and packaged for commerical use.

EXAMPLE 2

To demonstrate the improved whey of the present invention, a comparison test was conducted in which fermented whey utilizing *Propionibacterium shermanii* as a fermenting agent, was compared with the same amount of fermented whey utilizing *Propionibacterium acidi-propionici* #B 3568 as a fermenting agent, and both test compositions were fermented for 48 hours and 67 hours, respectively, in a culture medium containing 2% Teklac (dried whey), 2% lactose, 1% yeast and 2% calcium carbonate. At the end of 48 hours and 67 hours, respectively, the fermentation culture was examined by gas chromatography for the percent of propionic acid present and also the percent of acetic acid present. The results of this test are shown in Table I below.

TABLE I

| Fermentation Bacterium | Incubation Period | | | |
|---|---|---|---|---|
| | 48 Hours | | 67 Hours | |
| | Propionic Acid % | Acetic Acid % | Propionic Acid % | Acetic Acid % |
| P. shermanii | 0.58 | 0.26 | 0.80 | 0.39 |
| P. acidi-propionici | 0.82 | 0.19 | 0.96 | 0.20 |

It is thus clear that fermented whey produced utilizing *Propionibacterium acidi-propionici* #B 3568 as the fermenting agent, possesses substantially greater quantities of propionic acid than whey fermented in accordance with the prior art methods. Inasmuch as the measure of mycostatic activity is directly proportional to the amount of propionic acid produced in the fermentation process, it is clear that the fermented whey produced in accordance with the method of the instant invention is superior as a mycostatic agent to that produced in accordance with the previous methods.

Fermentation with *Propionibacterium acidi-propionici* #B 3568 of a whey broth comprising unhydrolyzed whey (acid or sweet), and yeast extract results in propionic acid formation and functionalization of the whey so that the whey product can be utilized as a food ingredient. This anaerobic fermentation can be carried out preferably in a pH range of 6 to 8, preferably with the pH maintained in a range from about 6.5 to about 7.5. The fermentation can be carried out at a temperature from about 20° to 35° C., preferably carried out at a temperature from about 25° to about 30° C. Typical composition of Teklac (sweet dairy whey) is as follows:

CHEMICAL AND PHYSICAL SPECIFICATIONS

Ingredient
Listing: Whey
Typical Proximate Analysis

| | |
|---|---|
| Protein (N × 6.38)% | 12.7 |
| Fat % | 1.1 (1.25% Maximum) |
| Moisture % | 4.5 (5.0% Maximum) |
| Ash % | 8.0 |
| Lactose % | 71.3 |
| Calories, Cal/100 g | 350.0 |
| Typical Vitamin & Mineral Analysis | |
| Vitamin A I.U./100 g | Nil |
| Vitamin C mg/100 g | Nil |
| Thiamin mg/100 g | 0.40 |
| Riboflavin mg/100 g | 1.76 |
| Niacin mg/100 g | 1.00 |
| Calcium % | 0.71 |
| Iron % | Nil |
| Vitamin $B_{12}$ ug/100 g | 2.12 |
| Phosphorus % | 0.69 |
| Pantothenic Acid mg/100 g | 4.09 |
| Microbiological Standards | |
| Standard Plate Count | 10,000/g (Maximum) |
| Coliforms | 9/g (Maximum) |
| E. coli | Negative |
| Salmonella | Negative |

The nutritional values listed above are within 80% of the value declared in compliance with Federal Nutritional Regulations 21 CFR §1.17(4) (ii).

| | Typical Range | Limit |
|---|---|---|
| Solubility Index | 0.1–0.5 ml | 1.25 ml Max. |
| Acidity | 0.10–0.14% | 0.16 Max. |
| Alkalinity of Ash | 175–200 ml | 225 ml Max. |
| Scorched Particles | 7.5 mg | 15.0 mg Max. |
| Particle size (Through 40 mesh) | 99–100% | 98% Min. |

Concentration of whey can range from about 0.5% to about 15.0%, preferably from about 2% to about 12%, and the additional yeast extract in the fermentation broth can range from about 0 to about 1.0% preferably from about 0.1% to about 0.5%. Adequate fermentation broth concentrations of propionic acid (>0.5% and preferably >1.3%) are usually reached within 40–70 hours. All of the above weight percents are in weight per volume.

The propionic acid is actually produced by the fermentation of the lactose constituent in whey. Lactose, as has been previously indicated, is present in dried whey, in an amount of about 73%.

As previously stated, the fermented whey is used as a mycostatic agent and incorporated into breads, pastries, and other bakery products.

It will be recognized by those skilled in the art that the conditions under which the whey is fermented can be varied, along with the fermentation medium, the concentration of the various substituents, and also the addition of other ingredients. All of these variations can be made without departing from the scope of the invention.

What is claimed is:

1. In a process for the manufacture of fermented whey having mycostatic activity in which the fermenting agent is a bacterium, and wherein said fermentation is conducted at a temperature, for a sufficient period of time, and in a medium conductive to fermentation, for substantially all of said whey to be converted into the fermented form, the improvement of using as the fermenting agent the bacterium Propionibacterium acidi-propionici #B 3568.

2. A process for the manufacture of fermented whey having mycostatic activity which comprises
   (a) selecting a quantity of whey,
   (b) subjecting said whey to the fermenting action of Propionibacterium acidi-propionici #B 3568, wherein said fermentation is conducted at a temperature and for a sufficient period of time, and in a medium conducive to fermentation, for substantially all of said whey to be converted into the fermented form, and
   (c) drying the fermented whey.

3. A process for the manufacture of fermented whey having mycostatic activity which comprises:
   (a) selecting a quantity of whey, and
   (b) admixing said whey with a fermenting medium in which the fermenting agent is Propionibacterium acidi-propionici #B 3568 wherein said fermentation is conducted at a temperature, for a sufficient period of time, and in a medium conducive to fermentation, for substantially all of said whey to be converted into the fermented form.

4. The process of claim 3 in which said fermented whey is subsequently dried.

* * * * *